United States Patent [19]

Kageyama et al.

[11] Patent Number: 5,099,944

[45] Date of Patent: Mar. 31, 1992

[54] TORQUE DISTRIBUTION CONTROL SYSTEM FOR A FOUR-WHEEL DRIVE MOTOR VEHICLE

[75] Inventors: Hayashi Kageyama, Tokyo; Shingo Oobayashi, Ohta; Makoto Shibuya, Ohta; Kazunari Tezuka, Niiza, all of Japan

[73] Assignee: Fuji Jukogyo Kabushiki Kaisha, Tokyo, Japan

[21] Appl. No.: 516,081

[22] Filed: Apr. 27, 1990

[30] Foreign Application Priority Data

Apr. 28, 1989 [JP] Japan .................. 1-111738

[51] Int. Cl.[5] .......................... B60K 17/35
[52] U.S. Cl. ..................... 180/249; 364/424.1
[58] Field of Search ........... 180/249, 247, 248, 250, 180/233; 364/424.1

[56] References Cited

U.S. PATENT DOCUMENTS

| | | | |
|---|---|---|---|
| 4,754,835 | 7/1988 | Stelter et al. | 180/233 X |
| 4,805,721 | 2/1989 | Takahashi et al. | 180/248 |
| 4,840,247 | 6/1989 | Kashihara et al. | 180/249 |
| 4,866,624 | 9/1989 | Nishikawa et al. | 180/249 X |
| 4,884,653 | 12/1989 | Kouno | 364/424.1 X |
| 4,936,406 | 6/1990 | Tezuka et al. | 180/249 |

FOREIGN PATENT DOCUMENTS

62-31529 2/1987 Japan .

Primary Examiner—Charles A. Marmor
Assistant Examiner—Kevin Hurley
Attorney, Agent, or Firm—Martin A. Farber

[57] ABSTRACT

A planetary gear device as a central differential distributes an output torque of a transmission to the front wheels and the rear wheels of a four-wheel drive motor vehicle. A fluid operated clutch is provided between a sun gear and a ring gear of the planetary gear device. A desired speed ratio between front-wheel speed and rear-wheel speed at cornering is calculated based on vehicle speed and steering angle of the vehicle. A torque distribution ratio is determined in accordance with a difference between the desired speed ratio and an actual speed ratio between the front-wheel speed and the rear-wheel speed. The clutch pressure is controlled in response to the torque distribution ratio for engaging the clutch so that the average speed ratio coverages to the desired speed ratio.

5 Claims, 6 Drawing Sheets

FIG. 6

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential.

Japanese Patent Application Laid-Open 62-31529 discloses a system for controlling torque distribution in a four-wheel drive motor vehicle of the rear drive type with a front-mounted engine. The system has a fluid operated clutch as a transfer clutch. A desired torque distribution ratio of torque is calculated in accordance with the difference between speeds of the front-wheel and the rear-wheel. Clutch pressure in the transfer clutch is controlled based on the desired torque distribution ratio so as to prevent the vehicle or the wheels from spinning or drifting.

In ordinary driving, the vehicle is driven through a two-wheel driving system by the rear wheels. When the vehicle is driven on a slippery road, the torque is distributed to the front wheels and controlled for preventing the wheels from spinning. Consequently, such a system can not be employed for the four-wheel drive vehicle which makes a turn with the four-wheel driving system in ordinary driving at an optimum distribution of the torque.

SUMMARY OF THE INVENTION

An object of the present invention is to provide a torque distribution control system for a four-wheel drive motor vehicle which makes a turn through a four-wheel driving system.

Another object of the invention is to provide a system in which a large torque is distributed to the rear wheels, thereby easily making a turn.

A further object of the present invention is to provide a system in which the distribution of the torque to the front wheels and rear wheels can be changed for preventing the vehicle from spinning or drifting.

According to the present invention, there is provided a system for controlling torque distribution to front wheels and rear wheels of a motor vehicle having an engine for driving the vehicle, a transmission, a central differential for distributing output torque of the transmission to the front wheels and the rear wheels, a clutch provided between a first output member of the central differential for the front wheels and a second output member of the central differential for the rear wheels, and sensors for detecting front-wheel speed, rear-wheel speed, vehicle speed and steering angle.

The system comprises a calculator for calculating a desired speed ratio between front-wheel speed and rear-wheel speed at cornering based on the vehicle speed and the steering angle, means for determining a torque distribution ratio in accordance with a difference between the desired speed ratio and an actual speed ratio, and a speed difference between the front-wheel and the rear-wheel, and control means responsive to the torque distribution ratio for engaging the clutch so as to converge the actual speed ratio to the desired speed ratio.

The other objects and features of this invention will become understood from the following description with reference to the accompanying drawings.

DETAILED DESCRIPTION OF THE PREFERRED EMBODIMENTS

Figure 1:
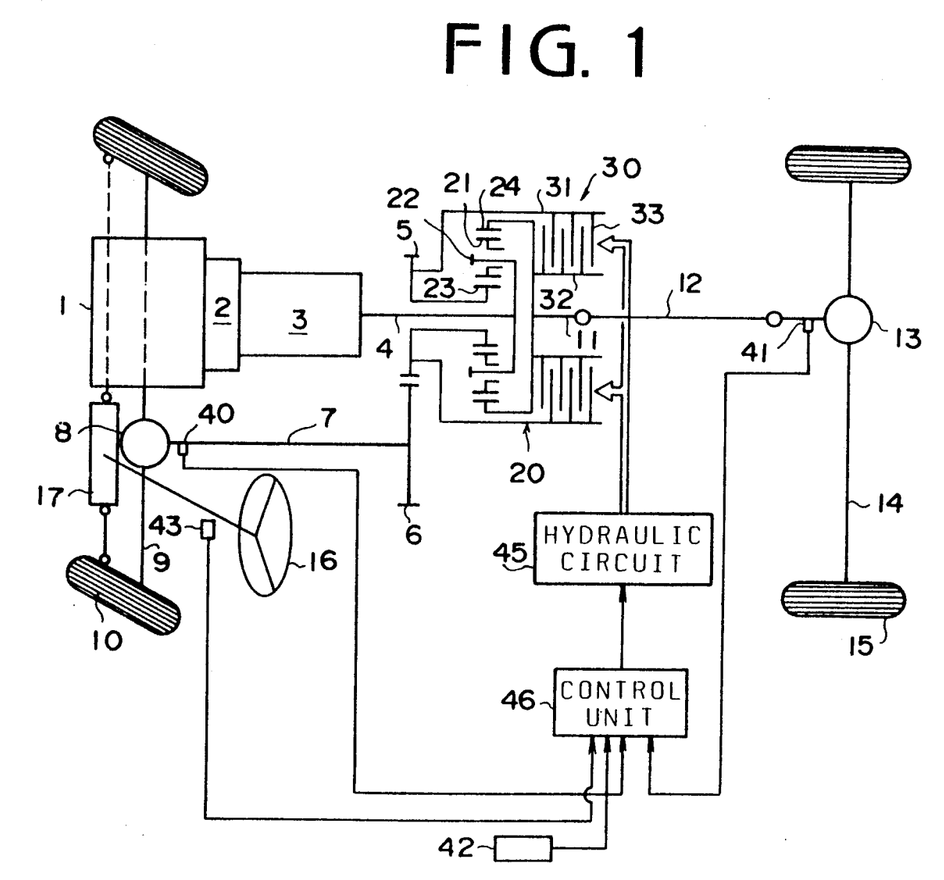
FIG. 1 is a schematic diagram showing a power transmission system for a four-wheel drive motor vehicle according to the present invention.

FIG. 1 shows a power transmission system for a four-wheel drive motor vehicle having a central differential 20 according to the present invention. In the system, torque of an engine 1 distributed to rear wheels 15 is set to a value larger than that to front wheels 10, which will be described hereinafter in detail. The engine 1 is mounted on a front portion of the vehicle. A clutch 2 and an automatic transmission 3 are disposed at the rear of the engine 1 in longitudinal direction of the vehicle. An output of the automatic transmission 3 is transmitted to an output shaft 4 which is aligned with the central differential 20 for rearwardly transmitting the torque. The output shaft 4 is connected to a parallel front drive shaft 7 cause the actual speed ratio n to converge which disposed under the automatic transmission 3 through a pair of reduction gears 5 and 6 of the central differential 20. The front drive shaft 7 is connected to the front wheels 10 through a front differential 8 and axles 9. The output shaft 4 is connected to a rear drive shaft 11 through the central differential 20. The rear drive shaft 11 is connected to the rear wheels 15 through a propeller shaft 12, a rear differential 13 and axles 14. A steering wheel 16 is connected to the front wheels 10 through a steering device 17.

Figure 2:
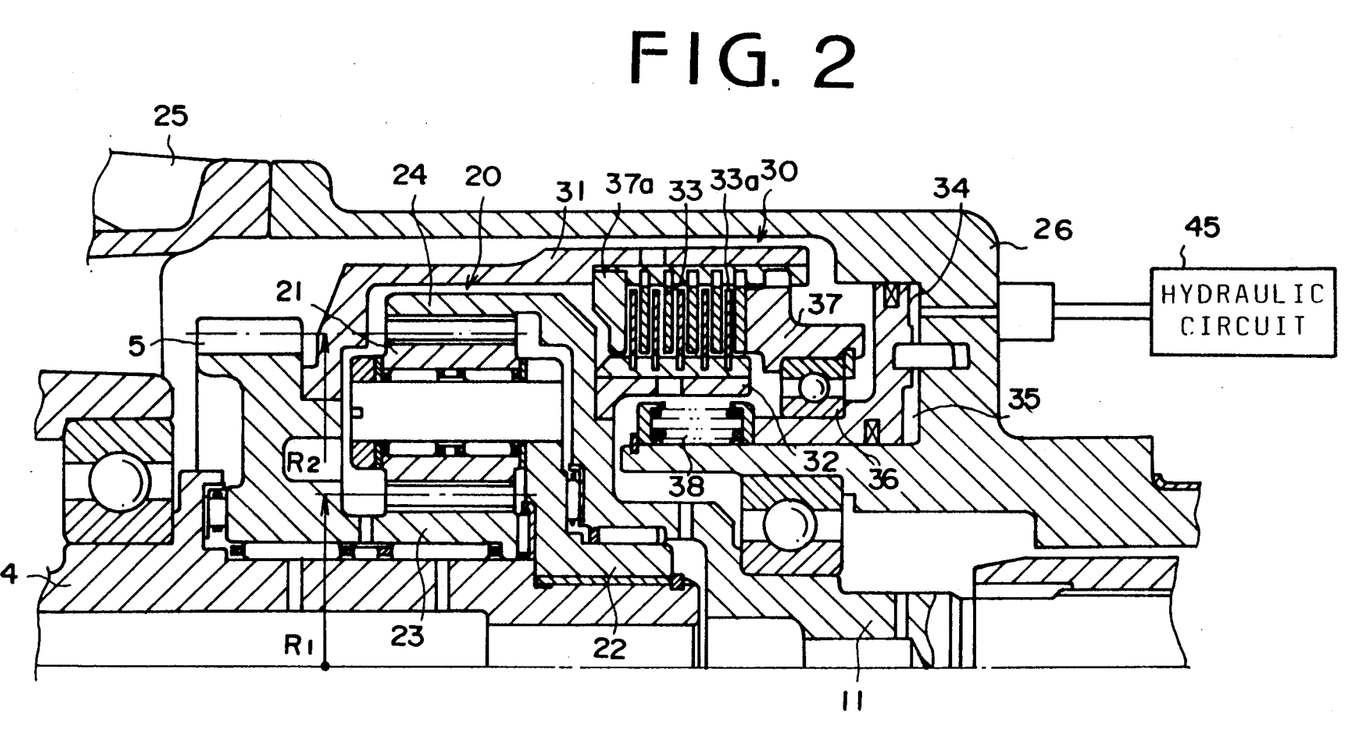
FIG. 2 is an enlarged sectional view showing a central differential of the system.

Referring to FIG. 2 showing the central differential 20, the reduction gear 5 is rotatably mounted on the output shaft 4. The central differential 20 is a planetary gear device and comprises a sun gear 23 rotatably mounted on the output shaft 4 and integrally formed with the gear 5, and a carrier 22 splined to an end of the output shaft 4. The central differential 20 further comprises planetary pinions 21 supported on the carrier 22 and meshed with the sun gear 23, a ring gear 24 integrally formed on the rear drive shaft 11 and meshed with the planetary pinions 21.

Thus, the output torque from the output shaft 4 is transmitted to the sun gear 23 and the ring gear 24 through the carrier 22 and the planetary pinions 21 at predetermined torque distribution ratios. A difference between rotating speeds of the sun gear 23 and the ring gear 24 is absorbed by the rotation and revolution of the planetary pinions 21.

In the central differential 20, force P exerted on toothed portions of the sun gear 23 and the force P applied to the ring gear 24 are equal to each other. Thus, output torque transmitted to the front wheels 10 is expressed as $P \cdot R1$, where R1 is a radius of the sun gear 23 and the output torque transmitted to the rear wheels 15 is expressed as P·R2, where R2 is the radius of the ring gear 24. Thus, the relationship between the front torque and the rear torque is P·R1<P·R2, so that a large torque is distributed to the rear wheels 15.

A fluid operated multiple-disk friction clutch 30 is provided adjacent the central differential 20 for controlling the distribution of the torque to the front and rear wheels.

The clutch 30 comprises a cylindrical drive drum 31 an end of which is secured to a hub of the gear 5, a driven drum 32 secured to the ring gear 24, a plurality of disks 33 splined on the drum 31, and a plurality of disks 33a splined on the drum 32, alternately arranged. A retainer 37a abuts an innermost portion of on the disk 33a. A piston 34 is slidably mounted in an extension case 26 attached to a rear portion of a transmission case 25. A pressure plate 37 is connected to the piston 34 through a bearing 36 and engaged with the disk 33 of the drum 31. An oil chamber 35 is formed between the piston 34 and the case 26.

When oil is supplied to the chamber 35, the piston 34 is pushed by pressure of the oil. The pressure plate 37 pushes the disks 33 and 33a to engage the clutch 30 for producing a clutch torque. A part of the output torque of the ring gear 24 is transmitted to the front wheels 10 when the clutch 30 is partially engaged, thereby changing the distribution of the torque. The sun gear 23 is coupled with the ring gear 24 when the clutch 30 is entirely engaged, thereby locking the central differential 20.

Referring back to FIG. 1, a front-wheel speed sensor 40 and a rear-wheel speed sensor 41 are provided for determining slipping and steering of the wheels, and a vehicle speed sensor 42 and a steering angle sensor 43 are also provided Output signals from the sensors 40, 41, 42, 43 are applied to a control unit 46 which produces a clutch control signal for controlling the clutch pressure of the clutch 30 through a hydraulic circuit 45.

Figure 3:
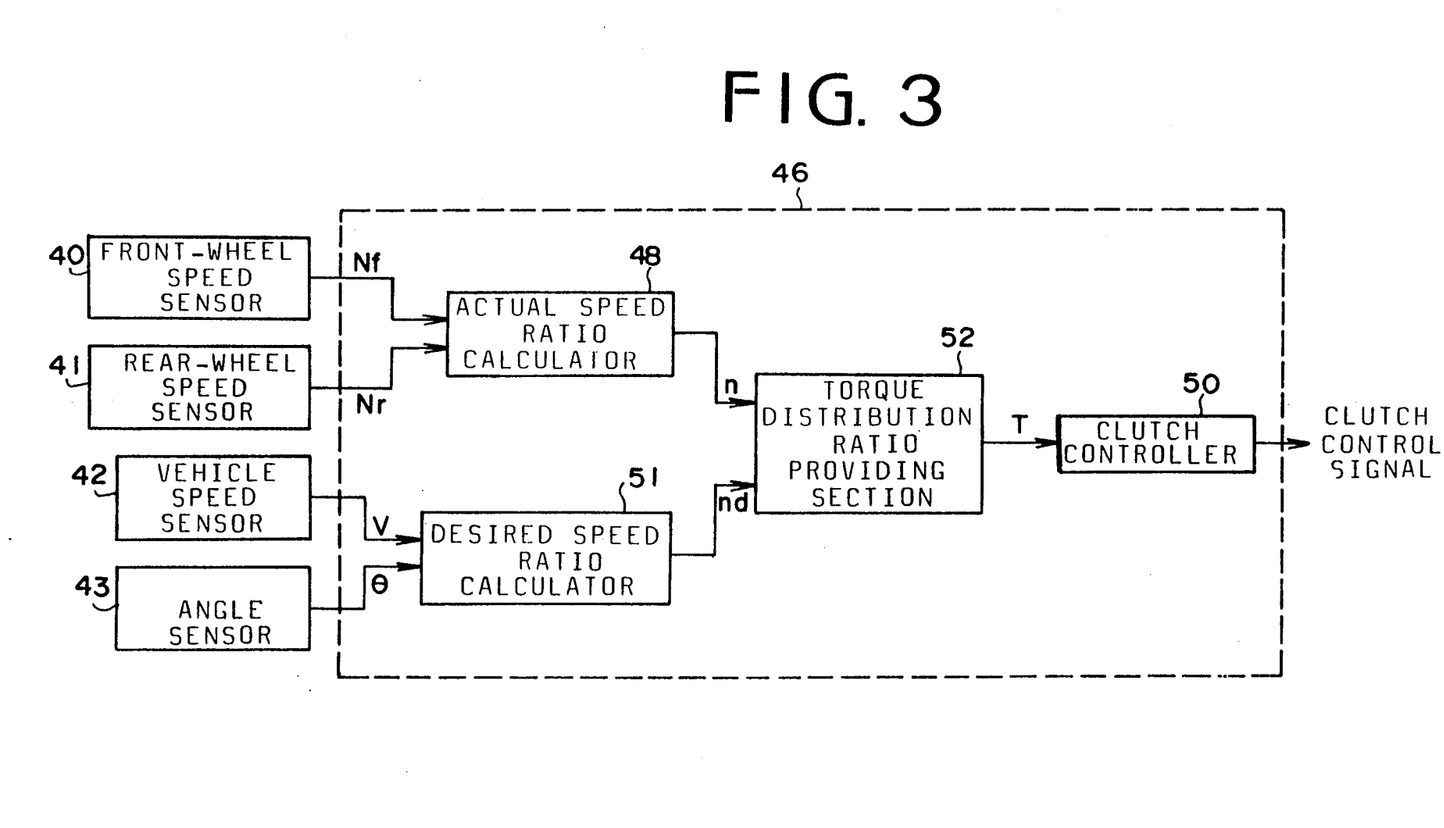
FIG. 3 is a block diagram showing a control unit of the system.

Referring to FIG. 3 showing the control unit 46, the control unit 46 is provided with an actual speed ratio calculator 48 which is fed with a front-wheel speed signal Nf from the front-wheel speed sensor 40 and a rear-wheel speed signal Nr from the rear-wheel speed sensor 41. An actual speed ratio n is calculated in accordance with the front-wheel speed signal Nf and rear-wheel signal Nr (Nr/Nf) and applied to a torque distribution ratio providing section 52. A vehicle speed signal V from the vehicle speed sensor 42 and a steering angle signal $\theta$ from the steering angle sensor 43 are applied to a desired speed ratio calculator 51 which calculates a desired speed ratio nd in accordance with the vehicle speed V and the steering angle $\theta$.

Figure 4:
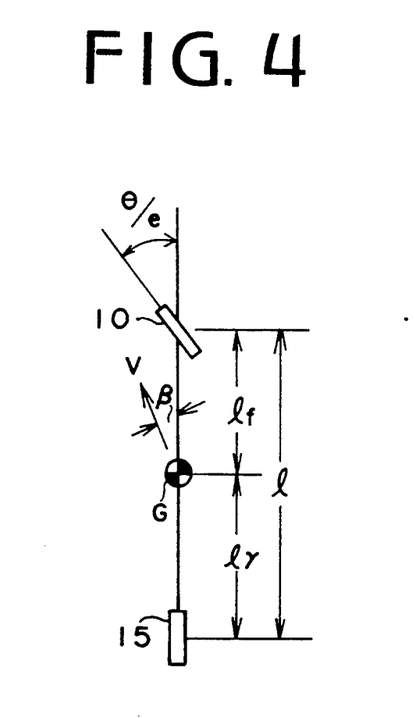
FIG. 4 is a schematic illustration showing a schematic relation between wheels and a gravity position of the vehicle.

FIG. 4 shows a schematic relation between the front and rear wheels 10, 15 and a center of gravity G of a vehicle when making a turn. A cornering radius r and a side slip angle $\beta$ of the vehicle are expressed as follows.

$$r = (1 + A\ V^2) \cdot 1 \cdot (e/\theta)$$

$$\beta = k2 \cdot \{(1 - k_1 \cdot V^2)/(1 + A\ V^2)\} \times (\theta/e)$$

where l is the wheel base of the vehicle, A is a stability factor, K1 and K2 are coefficients, and e is a steering gear ratio.

In accordance with the aforementioned equation, the desired speed ratio nd is expressed as $$nd \approx (r - l\ r \sin \beta)/(r + l f \sin \beta)$$

where lf is the distance from the center of gravity of the vehicle to the front axle, and lr is the distance from the center of gravity of the vehicle to the rear axle.

In the desired speed ratio calculator 51, the desired speed ratio nd is calculated in accordance with the aforementioned equation, which is applied to the torque distribution ratio providing section 52.

On the other hand, the desired speed ratios nd may be stored in a desired speed ratio look-up table, which are arranged in accordance with the vehicle speed V and the steering angle $\theta$ so that one of the desired speed ratios can be derived from the look-up table.

In the torque distribution ratio providing section 52, a torque distribution ratio T(F/R) is determined based on a difference $\Delta n$ between an actual speed ratio n and the desired speed ratio nd.

If an excessive torque is applied to either the front or rear wheels because of spinning, the relationship between the actual speed ratio n and the desired speed ratio nd at cornering becomes n≠nd as described hereinafter. If the connecting force of the front wheels 10 and rear wheels 15 is increased by increasing the clutch pressure, the front-wheel speed signal Nf and the rear-wheel speed signal Nr approach each other to cause the actual speed ratio n to converge to the desired speed ratio nd.

Figure 5A:
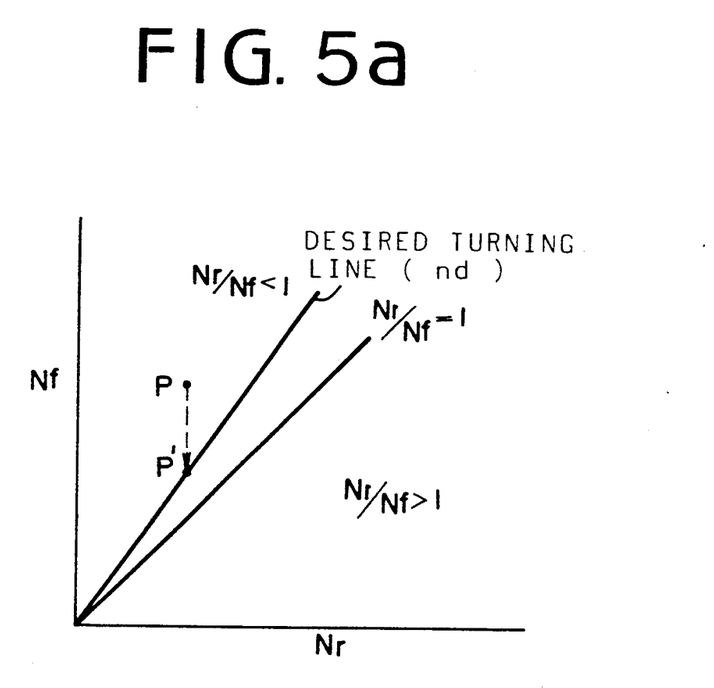
FIG. 5a is a graph showing a control range of a speed ratio between front wheels and rear wheels.
Figure 5B:
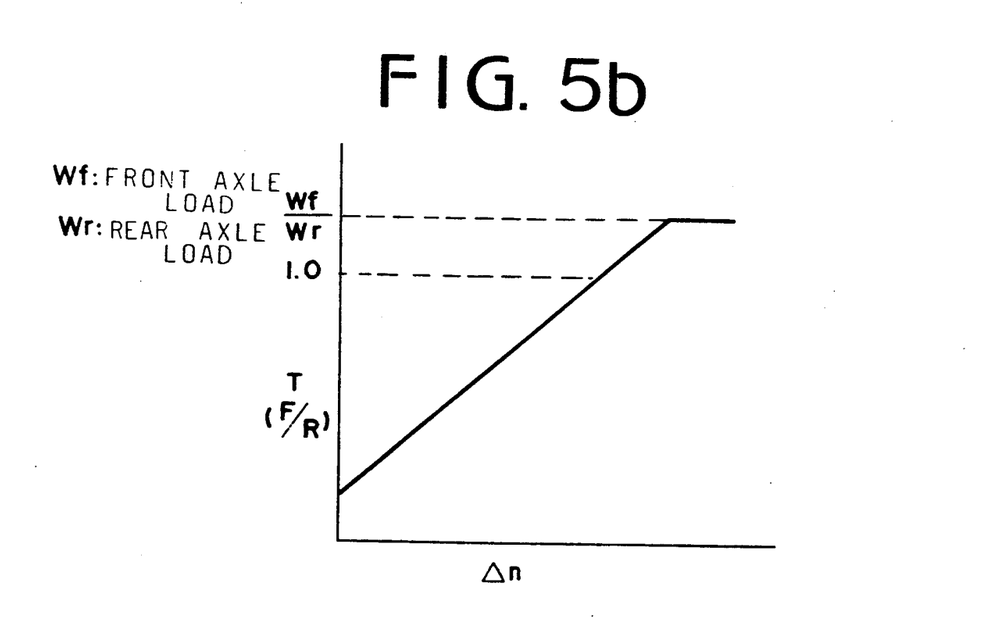
FIG. 5b is a graph showing a look-up table of a torque distribution ratio.

The control ranges of the front-wheel speed signal Nf and the rear-wheel speed signal Nr at cornering is determined as shown in the graph of FIG. 5a. The torque distribution ratio T is determined in accordance with the difference $\Delta n$ between the actual speed ratio n and the desired speed ratio nd as shown in the graph of FIG. 5b, so that the torque distribution ratio T is derived from the look-up table based on the graph of FIG. 5b. A clutch controller 50 produces a signal for the clutch pressure corresponding to the torque distribution ratio T.

Describing the operation of the system, the power of the engine 1 is transmitted to the transmission 3 at which the transmission ratio is automatically controlled. The output of the transmission is transmitted from the output shaft 4 to the carrier 22 of the central differential 20.

Accordingly, the output torque of the sun gear 23 is transmitted to the front wheels 10 through the reduction gears 5 and 6, the front drive shaft 7 and the front differential 8 at a predetermined distribution ratio. The output torque of the ring gear 24 is transmitted to the rear wheels 15 through the rear drive shaft 11, the propeller shaft 12 and the rear differential 13 at a predetermined distribution ratio. Thus, a full-time four-wheel driving is established.

In this state, the front-wheel speed signal Nf and the rear-wheel speed signal Nr are applied to the actual speed ratio calculator 48 to calculate the actual speed ratio n.

If no slipping state is detected in the control unit 46 while the vehicle is driven on a dry road, a clutch control signal is applied from the clutch controller 50 to the hydraulic circuit 45. Thus, the clutch control pressure becomes zero and the clutch 30 is disengaged. Since the torque transmitted to the rear wheels 15 is held to a value larger than that to the front wheels 10, the vehicle is driven under the understeer condition, so that good operability is ensured.

When the vehicle makes a turn, the speed ratio between the front-wheel speed and the rear-wheel speed is detected in accordance with the desired speed ratio nd calculated in the desired speed ratio calculator 51 corresponding to the vehicle speed V and the steering angle $\theta$. If the wheels do not slip, the sun gear 23 and the ring gear 24 of the central differential 20 rotate without the differential restricting operation to sufficiently absorb the rotational speed difference of the front wheels 10 and rear wheels 15, so that the vehicle smoothly negotiates a sharp corner by the differential operation of the central differential 20.

If the vehicle is driven on a slippery road, the slipping of the wheels 10, 15 is detected at the torque distribution ratio providing section 52 in accordance with an equation: $Nr/Nf \neq nd$. The torque distribution ratio providing section 52 produces a torque distribution ratio T corresponding to the slipping of the wheels 10, 15 to determine the clutch pressure at slipping. When the clutch pressure of the clutch 30 becomes maximum by the hydraulic circuit 45, the sun gear 23 is directly engaged with the ring gear 24 to lock the central differential 20. Thus, the four-wheel driving is established in accordance with the torque distribution corresponding to the axle loads of the front wheels 10 and the rear wheels 15. Thus, the torque distribution is continuously controlled in accordance with the slipping condition for preventing the wheels 10, 15 from slipping.

When the vehicle rounds a corner during four-wheel driving, the actual speed ratio n is calculated at the actual speed ratio calculator 48 based on the rear-wheel speed signal Nr and the front-wheel speed signal Nf at the cornering. The desired speed ratio nd is calculated or derived from the look-up table at the desired speed ratio calculator 51 in accordance with the steering angle $\theta$ and the vehicle speed V. The speed ratios n and nd are applied to the torque distribution ratio providing section 52.

When an excessive torque is transmitted to the rear wheels 15 at cornering by spinning of the wheels 10, 15, the vehicle makes a turn under the oversteering condition. Accordingly, the speed ratios n and nd becomes $n > nd$. If the vehicle is making a turn under the understeer condition because of an excessive torque to the front wheels due to spinning, the speed ratios n and nd become $n < nd$. Accordingly, the torque distribution ratio providing section 52 determines the torque distribution ratio T in accordance with the difference $\Delta n$ between the speed ratios n and nd. In response to the torque distribution ratio T, a clutch pressure is produced in the hydraulic circuit 45 for increasing the clutch pressure of the clutch 30. The torque corresponding to the clutch pressure is transmitted from the ring gear 24 to the reduction gear 5, or transmitted from the gear 5 to the ring gear 24 to increase the distribution of torque to either the front wheels 10 and the rear wheels 15. As a result, the difference $\Delta n$ becomes small.

If the actual speed ratio n has a value at a point P shown in the graph of FIG. 5a, the value at the point P is corrected to a value at a point P' on the line of the desired speed ratio nd. Thus, the spinning of wheels 10, 15 is suppressed, so that four wheels of the vehicle make a turn on the desired turning line.

Figure 6:
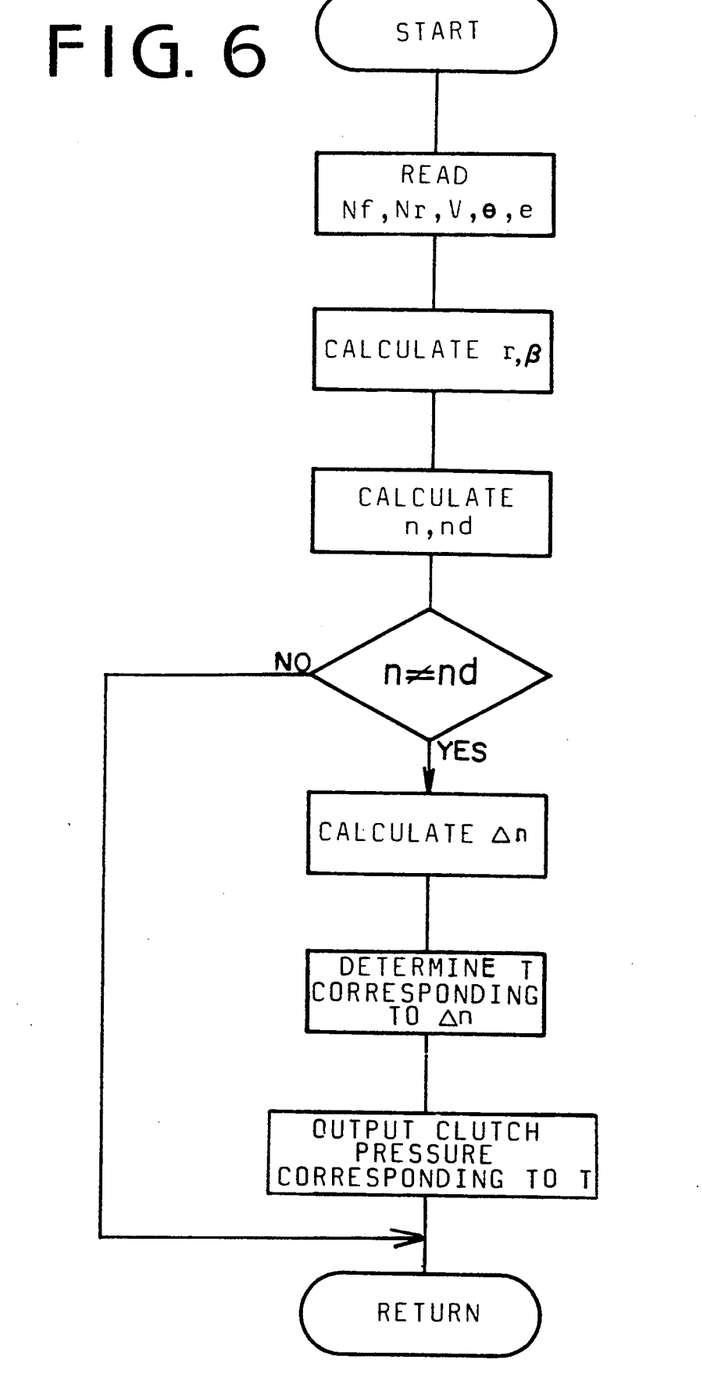
FIG. 6 is a flowchart showing an operation of the system.

FIG. 6 shows the flowchart of the above described operation.

The system of the present invention can be employed in a four-wheel drive motor vehicle of other types such as the type of the front drive with a front-mounted engine.

In the present embodiment, although the torque distribution ratio is determined in accordance with the difference between the actual speed ratio and the desired speed ratio, the torque distribution ratio can be determined in accordance with an actual speed difference and a desired speed difference.

In accordance with the present invention, even if in the vehicle having a large front axle load, the torque of the front wheels can be reduced, thereby obtaining a good cornering characteristic during making a turn and ensuring the largest output power of the engine for the four-wheel driving system. Further, the spinning of wheels is suppressed, so that the vehicle can make a desired turn.

Since the actual and desired speed ratios are employed for controlling the distribution of the torque, the conditions of the vehicle when making a turn are accurately determined, thereby ensuring controlling of the torque distribution. Since a large torque is transmitted to the rear wheels, a wide range of controlling the torque distribution can be performed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a system for controlling torque distribution to front wheels and rear wheels of a motor vehicle with an engine for driving the vehicle having a transmission, a central differential for distributing output torque of the transmission to the front wheels and the rear wheels, the system comprising speed sensing means for sensing front-wheel speed, rear-wheel speed, and vehicle speed and for generating a front-wheel speed signal, a rear-wheel speed signal, and a vehicle speed signal, respectively, a steering sensor for sensing steering angle and for generating a steering angle signal, and restricting means provided between a first output member of the central differential for the front wheels and a second output member of the central differential for the rear wheels for restricting differentiation by the central differential to obtain a variable torque distribution, the improvement in the system further comprising:

actual speed ratio calculating means responsive to the front-wheel speed signal and the rear-wheel speed signal for calculating actual speed ratio of the speeds of the front and rear wheels, and for generating an actual speed ratio signal, desired speed ratio deciding means responsive to the vehicle speed signal and the steering angle signal for deciding a desired speed ratio representing a theoretically optimum speed ratio without a wheel slipping as a function of said vehicle speed and said steering angle and for generating a desired speed ratio signal, difference calculating means for calculating the difference between said desired speed ratio and said actual speed ratio and for generating a difference signal, torque distribution ratio determining means responsive to said difference signal for determining torque distribution ratio in accordance with said optimum speed ratio and for generating a torque distribution ratio signal, and driving means responsive to said torque distribution ratio signal for driving said restricting means so as to obtain optimum cornering characteristic even when a loading distribution is changed from said front wheels to said rear wheels without spinning of said vehicle.

2. The system according to claim 1, wherein comprises:
said desired speed ratio deciding means comprises:
first calculating means responsive to the vehicle speed signal and the steering angle signal for calculating a cornering radius and a side slip angle of the vehicle; and
second calculating means for calculating said desired speed ratio in accordance with the cornering radius and the slip angle.

3. The system according to claim 1, further comprising
a desired speed ratio table storing a plurality of predetermined desired speed ratios relating to vehicle speeds and steering angles for deciding said desired speed ratio in dependency on the vehicle speed and the steering angle.

4. The system according to claim 2, wherein said first calculating means calculates said cornering radius and said side slip angle of the vehicle from the following equations:

$$r = (1 + A V^2) \cdot 1 \cdot (e/\theta)$$

$$\beta = K_2 \cdot \{(1 - K_1 \cdot V^2)/(1 + A V^2)\}$$

wherein r is the cornering radius, $\beta$ is the slip angle, $\theta$ is the steering angle, V is the vehicle speed, l is wheel base of the vehicle, A is a stability factor, K1 and K2 are coefficients, and e is a steering gear ratio.

5. The system according to claim 4, wherein
said second calculating means calculates the desired speed ratio (nd) from the following equation:

$$n\,d \approx (r - l\,r\,\sin\beta)/(R + l\,f\,\sin\beta)$$

wherein lf is the distance from center of gravity of the vehicle to a front axle of the vehicle, and lr is the distance from the center of gravity of the vehicle to a rear axle of the vehicle.

* * * * *